(12) United States Patent
Lin et al.

(10) Patent No.: US 9,895,823 B2
(45) Date of Patent: Feb. 20, 2018

(54) MITER SAW

(71) Applicant: SUMEC HARDWARE & TOOLS CO., LTD., Nanjing (CN)

(72) Inventors: Youyu Lin, Nanjing (CN); Kai Liu, Nanjing (CN)

(73) Assignee: SUMEC HARDWARE & TOOLS CO., LTD., Nanjing (CN)

( * ) Notice: Subject to any disclaimer, the term of this patent is extended or adjusted under 35 U.S.C. 154(b) by 135 days.

(21) Appl. No.: 14/929,439

(22) Filed: Nov. 2, 2015

(65) Prior Publication Data
US 2016/0052159 A1 Feb. 25, 2016

Related U.S. Application Data

(63) Continuation-in-part of application No. PCT/CN2013/084077, filed on Sep. 24, 2013.

(30) Foreign Application Priority Data

May 9, 2013 (CN) .......................... 2013 1 0170570

(51) Int. Cl.
*B23D 45/02* (2006.01)
*B27B 27/10* (2006.01)
*B23D 47/02* (2006.01)
*B23Q 1/74* (2006.01)

(52) U.S. Cl.
CPC ............ *B27B 27/10* (2013.01); *B23D 45/024* (2013.01); *B23D 47/025* (2013.01); *B23Q 1/74* (2013.01)

(58) Field of Classification Search
CPC .... B27B 27/10; B23D 45/024; B23D 47/025; B23Q 1/74; B27C 5/02; B27C 5/04; B27C 5/06; B25B 5/08; Y10T 403/76; Y10T 403/7051; Y10T 403/7064; Y10T 403/5793; F16B 2/14

See application file for complete search history.

(56) References Cited

U.S. PATENT DOCUMENTS 906,693 A * 12/1908 Cook .................. F16B 7/105
172/415
2011/0011229 A1* 1/2011 Lawlor ................ B23D 45/044
83/100

FOREIGN PATENT DOCUMENTS

| CN | 201353669 Y | * | 12/2009 |
| CN | 102310234 A | * | 1/2012 |

* cited by examiner

*Primary Examiner* — Jonathan Riley
*Assistant Examiner* — Liang Dong
(74) *Attorney, Agent, or Firm* — Matthias Scholl, PC; Matthias Scholl

(57) ABSTRACT

An improved miter saw, including a base, a workbench, a stop plate, a swing arm, a motor, a cutting assembly, and an extension platform. The workbench is rotationally disposed on the base. The swing arm is rotationally disposed on the rear of the workbench. The stop plate is disposed on the rear of the base. The extension platform is disposed on two sides of the base. The upper surface of the extension platform and the supporting surface of the base are in a same plane. The extension platform is movably connected to the base through a guide rod. The extension platform comprises an L-shaped limit block and a recess corresponding to the L-shaped limit block. The L-shaped limit block is adapted to turn over in the recess horizontally or vertically along the length direction of a workpiece mounted on the workbench for cutting.

5 Claims, 5 Drawing Sheets

MITER SAW

CROSS-REFERENCE TO RELATED APPLICATIONS

This application is a continuation-in-part of International Patent Application No. PCT/CN2013/084077 with an international filing date of Sep. 24, 2013, designating the United States, now pending, and further claims priority benefits to Chinese Patent Application No. 201310170570.0 filed May 9, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention
The invention relates to an improved miter saw.
Description of the Related Art
Typically, a workpiece mounted on a miter saw is extensible, and the extended part of the workpiece is supported by a metal rod. However, the metal rod does not usually have a stop block, so the positioning and the cutting length are inaccurate. Although a few miter saws are provided with a stop block, it is difficult for the stop block to be placed in different positions, which results in a low working efficiency. In addition, the extension platform is typically flexibly-connected to the base of the miter saw, which adversely affects the cutting operation.

SUMMARY OF THE INVENTION

In view of the above-described problems, it is one objective of the invention to provide a miter saw comprising an extension platform. The extension platform of the miter saw can be tightly locked, and the limit block disposed on the extension platform can readily turn over, both of which is favorable for the rapid and accurate cutting of a workpiece.

To achieve the above objective, in accordance with one embodiment of the invention, there is provided a miter saw, comprising a base, a workbench, a stop plate, a swing arm, a motor, a cutting assembly, and an extension platform. The workbench is rotationally disposed on the base. The swing arm is rotationally disposed on a rear of the workbench. The stop plate is disposed on a rear of the base. The extension platform is disposed on two sides of the base. An upper surface of the extension platform and the supporting surface of the base are in a same plane. The extension platform is movably connected to the base through a guide rod. The extension platform comprises an L-shaped limit block and a recess corresponding to the L-shaped limit block; the L-shaped limit block is adapted to turn over in the recess horizontally or vertically along a length direction of a workpiece mounted on the workbench for cutting. An inner wall of the recess is provided with a lug boss comprising an upper surface and a lower surface; the upper surface and the lower surface of the lug boss are configured to limit turning angles of two edges of the L-shaped limit block. The recess is located at a right angle resulting from the intersection of a lateral surface and an upper surface of the extension platform; the limit block is disposed on the extension platform via a rotary shaft; and the rotary shaft of the limit block is vertical to the guide rod of the extension rod.

In a class of this embodiment, a plurality of elastic O-type rings are disposed between the limit block and the extension platform.

In a class of this embodiment, a movable wedge block is disposed in a gap between the base and the guide rod; the wedge block is connected to a locking handle.

In a class of this embodiment, the base is provided with a locating block; an acute angle is formed between the locating block and the guide rod towards a center of the workbench; and the wedge block is located in the acute angle.

In a class of this embodiment, the wedge block is installed on the base via a rotary shaft of the wedge block, and the wedge block is adapted to rotate around the rotary shaft of the wedge block.

Advantages of the miter saw according to embodiments of the invention are that the extension platform of the miter saw can be tightly locked in a desired position, and the limit block disposed on the extension platform can readily turn over, both of which are favorable for the rapid and accurate cutting of the workpiece mounted on the miter saw.

In the figures, the following reference numbers are used: 1. Extension platform; 2. Limit block; 3. Rotary shaft of limit block; 4. Guide rod; 5. Locating block; 6. Wedge block; 7. Rotary shaft of wedge block; 8. Locking handle; 9. Base; 10. Workbench; 11. Stop plate; 12. Swing arm; 13. Motor; 14. Main handle; 15. Cutting assembly; 16. Elastic O-type ring; 101. Lower positioning surface; 102. Upper positioning surface; 201. Vertical positioning surface; 202. Horizontal positioning surface; 901. Mounting hole of guide rod; M. Locking direction of locking handle; N. Wedge direction of wedge block.

DETAILED DESCRIPTION OF THE EMBODIMENTS

For further illustrating the invention, experiments detailing a miter saw comprising an extension platform are described below. It should be noted that the following examples are intended to describe and not to limit the invention.

Figure 1:
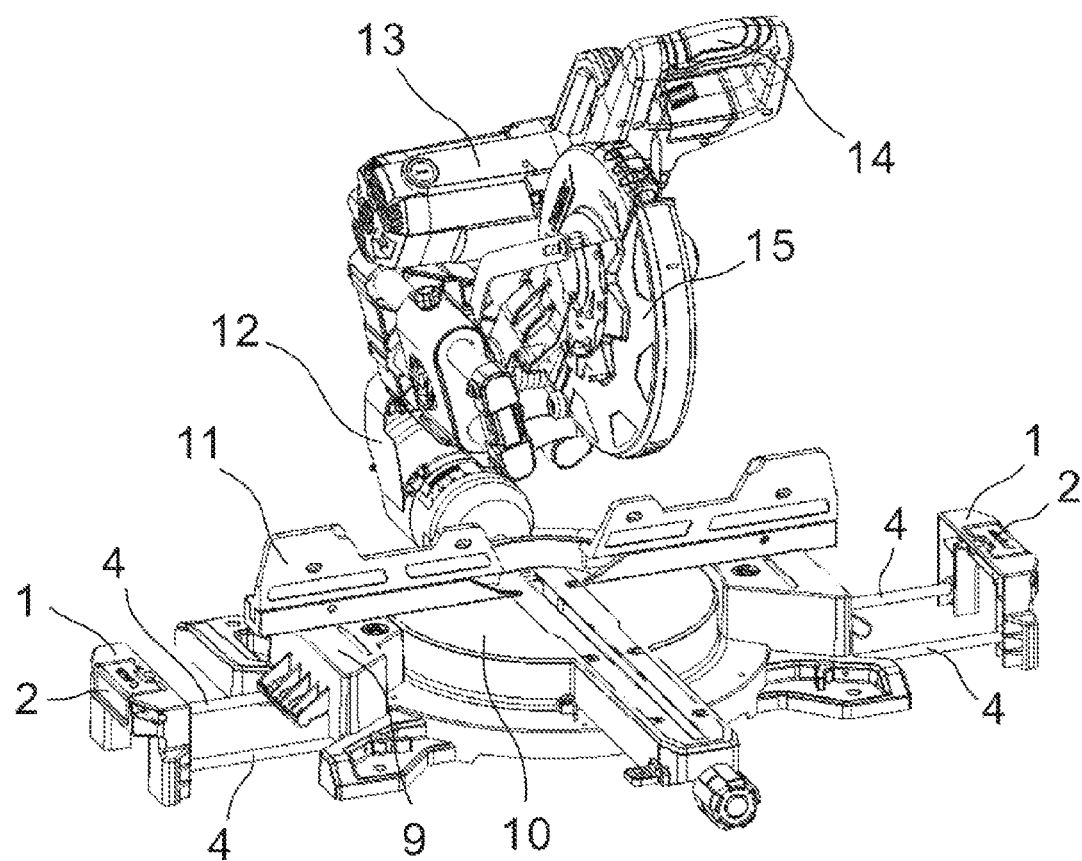
FIG. 1 is a schematic diagram of a miter saw comprising an extension platform in accordance with one embodiment of the invention.

As shown in FIG. 1, a miter saw comprises a base 9, a workbench 10, a stop plate 11, a swing arm 12, a motor 13, a cutting assembly 15, and an extension platform 1. The workbench 10 is rotationally disposed on the base 9. The swing arm 12 is rotationally disposed on the rear of the workbench 10. The stop plate 11 is disposed on the rear of the base 9. The cutting assembly 15 is provided with a main handle 14. The extension platform 1 is disposed on two sides of the base 9. The upper surface of the extension platform 1 and the supporting surface of the base 9 are in a same plane. The extension platform 1 is movably connected to the base 9 through a guide rod 4. The extension platform 1 is adapted to move outwards along an axial direction of the guide rod.

Figure 2:
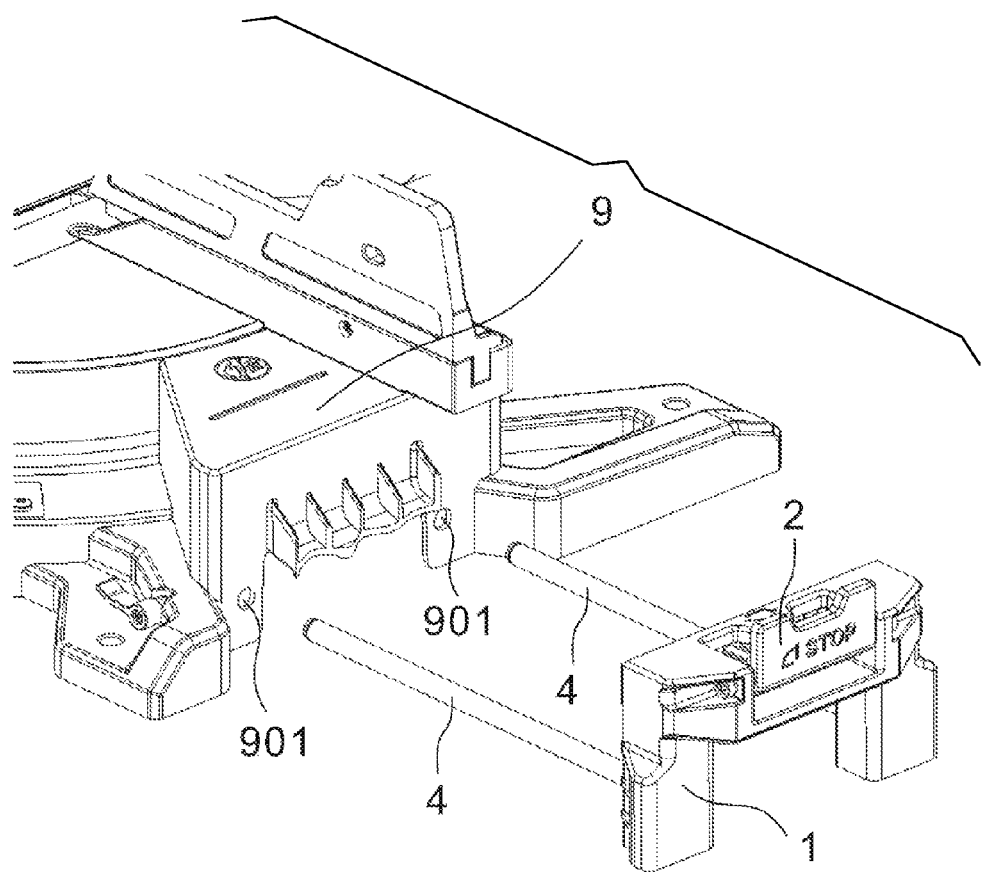
FIG. 2 is an installation diagram of an extension platform and a base of a miter saw comprising an extension platform in accordance with one embodiment of the invention.

FIG. 2 is an installation instruction of the extension platform and the base of the miter saw. As shown in FIG. 2, a side face of the base 9 is provided with mounting holes 901 of the guide rod, and the guide rod of the extension platform is installed in the mounting holes 901.

As shown in FIGS. 1-2 and FIGS. 5-7, the extension platform 1 is provided with a limit block 2. The limit block 2 is adapted to turn over in the recess horizontally or vertically along a length direction of a workpiece mounted on the workbench for cutting.

Figure 3:
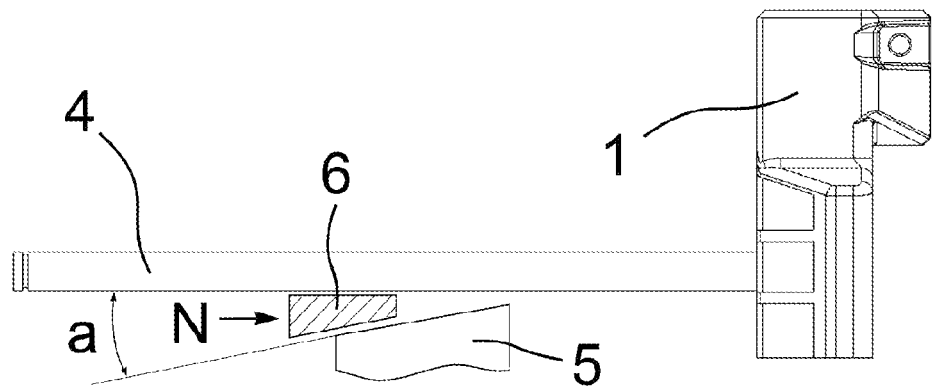
FIG. 3 is a front view of a locking structure of an extension platform of a miter saw in accordance with one embodiment of the invention.
Figure 4:
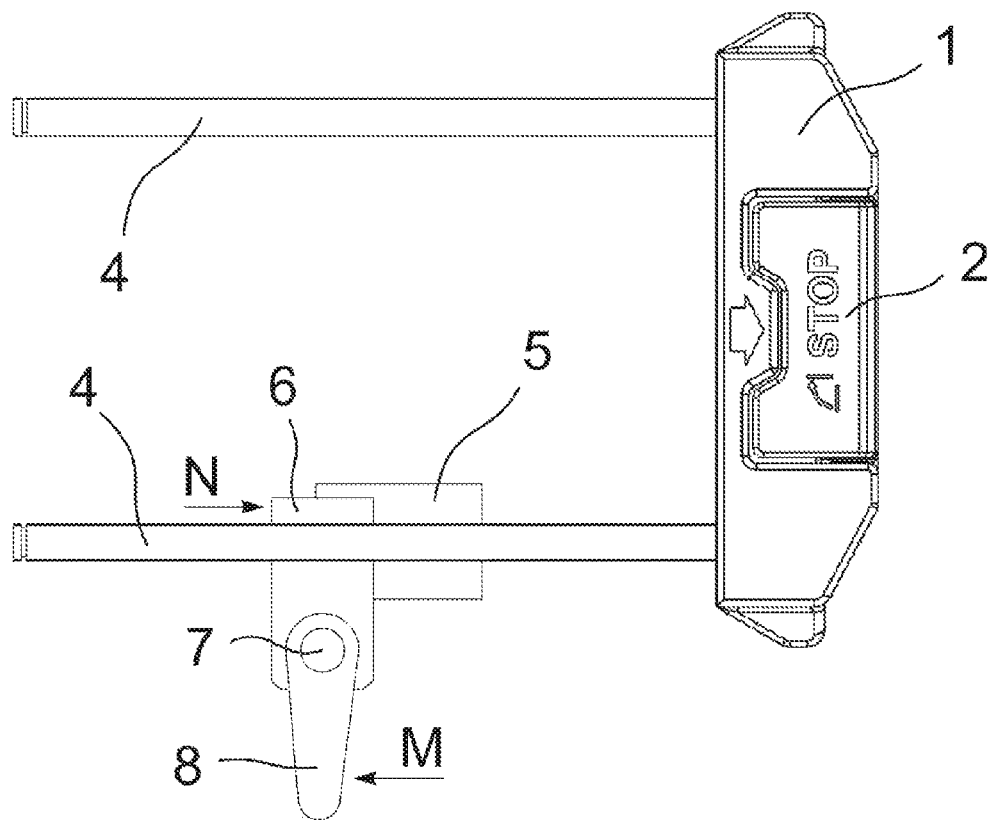
FIG. 4 is a top view of a locking structure of an extension platform of a miter saw in accordance with one embodiment of the invention.

FIG. 3 is a front view of a locking structure of the extension platform of the miter saw. FIG. 4 is a top view of a locking structure of the extension platform of the miter saw. As shown in FIGS. 3-4, a movable wedge block 6 is disposed in the gap between the base and the guide rod. The wedge block 6 is connected to a locking handle 8. The base is provided with a locating block 5. An acute angle a is formed between the locating block 5 and the guide rod 4 towards the center of the workbench. The wedge block 6 is disposed in the acute angle a. Looking along the guide rod 4 and towards the center of the workbench, the wedge block 6 is wedge-shaped, and the end thereof close to the workbench is bigger. Through the locking structure, the limit block is guaranteed to be tighter as pulled outside, and to be packed up inward quickly.

As shown in FIG. 4, the wedge block 6 is installed on the base via a rotary shaft of the wedge block 7, and the wedge block 6 can rotate around the rotary shaft 7. One end of the wedge block is connected to the locking handle 8. The locking handle 8 can control the rotation of the wedge block 6 around the rotary shaft 7 so as to lock the extension platform and achieve a reliable locking.

As shown in FIGS. 3-4, when the locking handle 8 is turned to the locking direction M of the locking handle, the wedge block 6 tends to tighten the extension platform 1 towards the wedge direction N of the wedge block.

Figure 5:
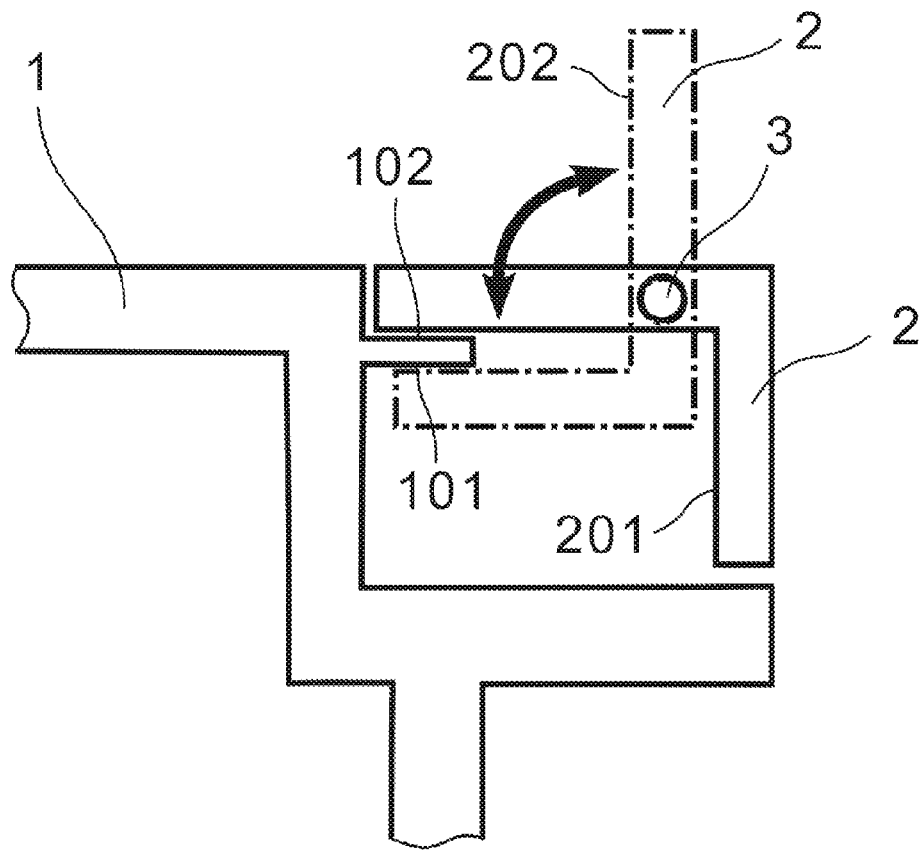
FIG. 5 is a schematic diagram of a limit block of a miter saw in accordance with one embodiment of the invention.
Figure 6:
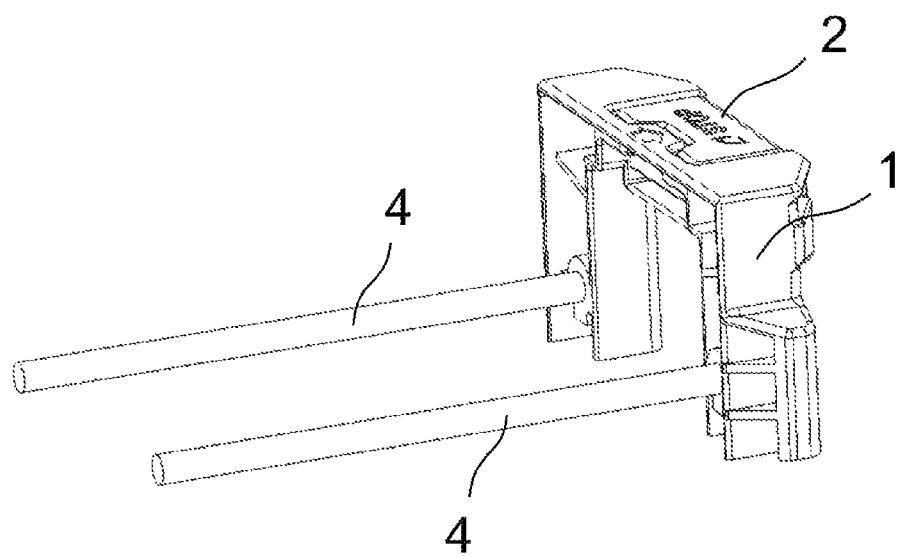
FIG. 6 is a diagram showing a closed state of a limit block of a miter saw in accordance with one embodiment of the invention.
Figure 7:
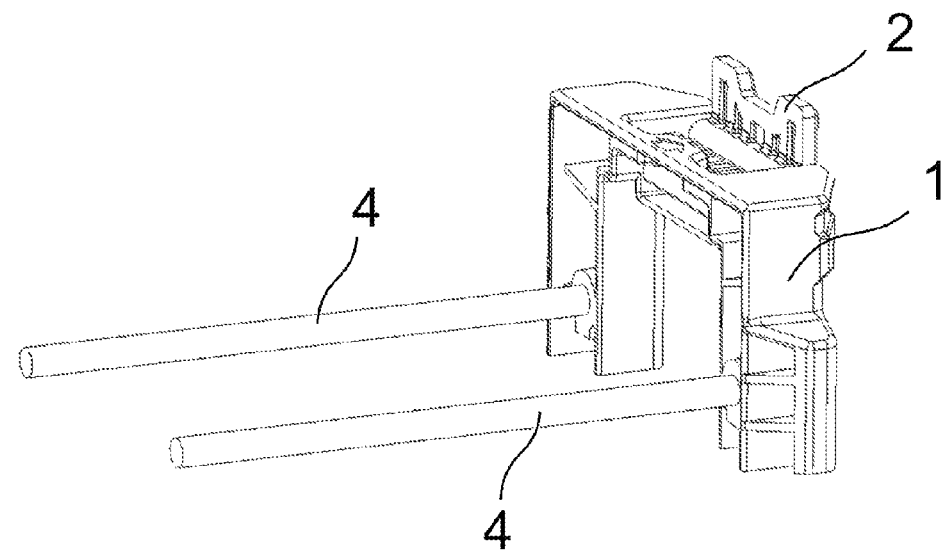
FIG. 7 is a diagram showing an open state of a limit block of a miter saw in accordance with one embodiment of the invention.
Figure 8:
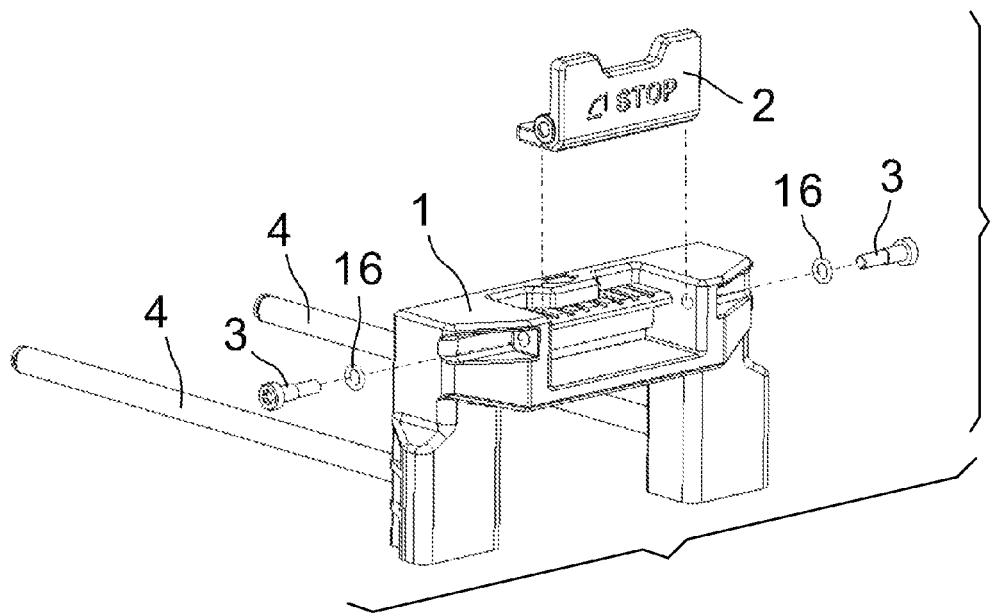
FIG. 8 is a schematic diagram showing an assembling state of a limit block of a miter saw in accordance with one embodiment of the invention.

As shown in FIGS. 2, 5, 8, the extension platform 1 is provided with a recess, and the limit block 2 is disposed in the recess. Preferably, the recess is disposed on the outer right-angle space apart from the workbench on the extension platform 1. Specifically, the recess is located at a right angle resulting from the intersection of a lateral surface and an upper surface of the extension platform. As shown in FIGS. 5-8, the limit block 2 is designed to be a right-angle L, thus the limit block 2 is integrated to the recess when packed up. As shown in FIGS. 5, 8, the limit block 2 is installed on the extension platform 1 via a rotary shaft of the limit block 3, and the rotary shaft of the limit block 3 is vertical to the moving direction of the extension platform.

The miter saw uses the outer right-angle space of the extension platform, and the limit block is designed to be a right-angle L, thus the limit block is integrated to the extension platform when packed up, and upon a tap of fingers, the limit block is opened up and turned, bringing in much convenience.

As shown in FIG. 5, the inner wall of the recess of the extension platform 1 is provided with a lug boss. The upper surface and the lower surface of the lug boss act as an upper locating surface 102 and a lower locating surface 101, respectively, and two inner surfaces of the limit block act as the vertical locating surface 201 and the horizontal locating surface 202. The upper locating surface 102 of the lug boss contacts the horizontal locating surface 202. The lower locating surface 101 of the lug boss contacts the vertical locating surface 201.

The extension platform surface is provided with bulges. The upper locating surface is employed to position the position of the limit block when packed up, and the lower locating surface is employed to position the open scope of the limit block.

As shown in FIG. 8, elastic O-type rings 16 are disposed between the limit block 2 and the extension platform 1. The O-type rings are employed to maintain a proper damping between the limit block and the extension platform surface, so that the position of the limit block is guaranteed not to change because of mechanical vibration.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A miter saw for cutting a workpiece, comprising:
a) a base;
b) a workbench;
c) a stop plate;
d) a swing arm;
e) a motor;
f) a cutting assembly; and
g) an extension platform;
wherein
the workbench is rotationally disposed on the base;
the swing arm is rotationally disposed on a rear of the workbench;
the stop plate is disposed on a rear of the base;
the extension platform is disposed on two sides of the base;
an upper surface of the extension platform and a supporting surface of the base are in a same plane;
the extension platform is movably connected to the base through a guide rod;
the extension platform comprises an L-shaped limit block and a recess corresponding to the L-shaped limit block;
an inner wall of the recess is provided with a lug boss comprising an upper surface and a lower surface;
the lug boss is fixed on the inner wall of the recess;
the recess is located at a right angle resulting from the intersection of a lateral surface and the upper surface of the extension platform;
the L-shaped limit block is disposed on the extension platform via a rotary shaft;
the rotary shaft of the L-shaped limit block is vertical to the guide rod of the extension rod;
the L-shaped limit block is rotatable around the rotary shaft in the recess;
the L-shaped limit block comprises a first plate and a second plate perpendicular to the first plate;

the L-shaped limit block is adapted for limiting the position of the workpiece;

the lug boss is disposed between the first plate and the second plate;

the upper surface and the lower surface of the lug boss are configured to limit turning angles of the L-shaped limit block;

when the L-shaped limit block is in use for limiting the position of the workpiece, the lower surface of the lug boss abuts against the second plate, and the first plate extends above the upper surface of the extension platform to abut against the workpiece; and when the L-shaped limit block is not in use for limiting the position of the workpiece, the upper surface of the lug boss abuts against the first plate.

2. The miter saw of claim 1, wherein a plurality of elastic O-type rings is disposed between the L-shaped limit block and the extension platform.

3. The miter saw of claim 2, wherein a movable wedge block is disposed in a gap between the base and the guide rod; the wedge block is connected to a locking handle.

4. The miter saw of claim 3, wherein the base is provided with a locating block; an acute angle is formed between the locating block and the guide rod towards a center of the workbench; and the wedge block is located in the acute angle.

5. The miter saw of claim 4, wherein the wedge block is installed on the base via a rotary shaft of the wedge block, and the wedge block is adapted to rotate around the rotary shaft of the wedge block.

* * * * *